INVENTORS
James E. Norcross
Royal David Thomas, Jr.
BY
ATTORNEYS

# United States Patent Office 3,059,093
Patented Oct. 16, 1962

3,059,093
WELDING PROCESS AND ELECTRODE FOR ALUMINUM
James E. Norcross, Media, and Royal David Thomas, Jr., Narberth, Pa., assignors to Arcos Corporation, Philadelphia, Pa., a corporation of Pennsylvania
Filed Aug. 10, 1959, Ser. No. 832,697
3 Claims. (Cl. 219—74)

The present invention relates to welding of aluminum, including consumable electrode welding, non-consumable electrode welding, and gas welding.

A purpose of the invention is to produce a weld of aluminum from an electrode which is free from pitting and porosity due to the formation of oxide on the surface of the electrode or rod.

A further purpose is to reduce the difficulty and expense of preparing welding electrodes and rods from alloys of aluminum, and particularly to eliminate the need for shaving of the surface, and for solvent and etching cleaning techniques, and to reduce the damage from exposure of the electrode to corrosive atmospheres.

A further purpose is to increase the ability of an aluminum base welding electrode or rod to maintain surface cleanliness during processing, storage and servicing, in spite of the presence of moisture and other corrosive influences.

A further purpose is to obtain better electrical surface contact on aluminum base alloy welding electrodes, improving the stability of the arc and reducing the tendency for hunting of the wire feed mechanism to maintain the predetermined arc voltage.

A further purpose is to obtain improved electrical conductivity in the skin portion of an aluminum base alloy welding electrode, thus reducing the voltage drop between the contact made to the electrode and the terminal end of the arc itself. This is a protection against the possibility of melting of the electrode at a point remote from the arc due to resistance heating occurring in the electrode itself.

Further purposes appear in the specification and in the claims.

In the drawings we have chosen to illustrate one only of the numerous embodiments in which the invention may appear, selecting the form shown from the standpoints of convenience in illustration, satisfactory operation and clear demonstration of the principles involved.

Figure 1:
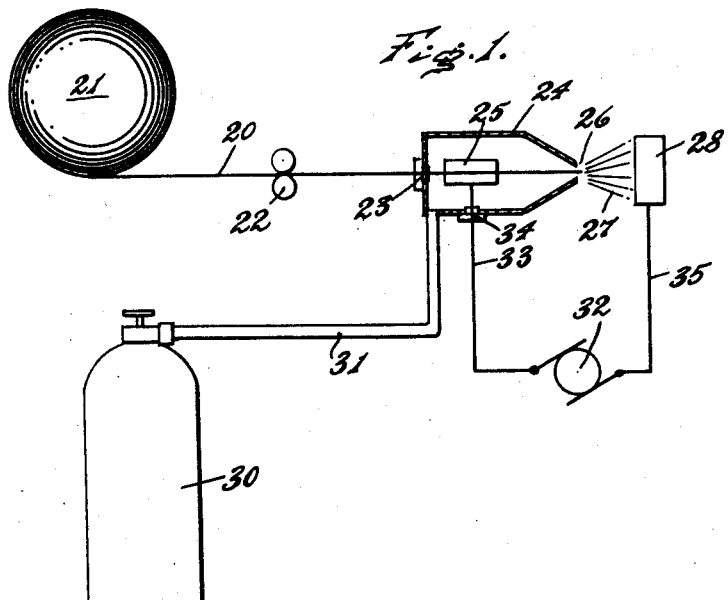
FIGURE 1 is a diagrammatic side elevation of a welding equipment for use in the invention.
Figure 2:
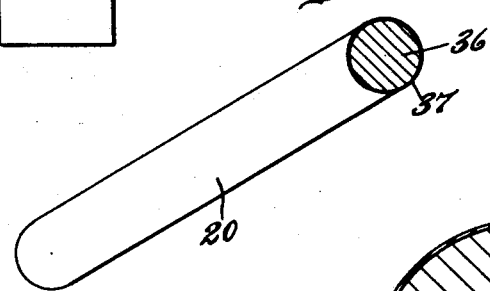
FIGURE 2 is a fragmentary perspective of a welding electrode or welding rod accordng to the invention.
Figure 3:
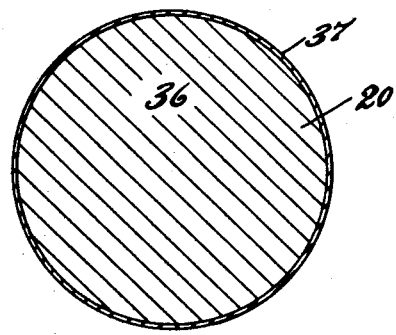
FIGURE 3 is an enlarged transverse section of the welding electrode or welding rod of FIGURE 2.

Describing in illustration but not in limitation, and referring to the drawings:

In the prior art a great deal of difficulty has been encountered in welding to deposit alloys of aluminum.

Aluminum base alloys other than substantially pure aluminum are likely to oxidize at the surface of the electrode or welding rod. This oxidation may occur prior to and during processing of the wire, and it may also occur after the wire has been completed and packaged as an electrode or welding rod, during intervals when the wire is unprotected at the point of use.

The presence in the aluminum alloy welding pool of this oxide leads to evolution of gas during solidification of the weld metal, and this has frequently caused porosity in the weld and poor mechanical properties.

This difficulty with weld porosity has been encountered in aluminum base alloys containing copper and in aluminum base alloys containing silicon and in aluminum base alloys containing zinc, but it is believed to be particularly prevalent in aluminum base alloys containing magnesium.

The complex oxide or hydroxide of aluminum and magnesium formed from oxidation of aluminum base alloys containing magnesium is particularly difficult to remove from the surface of the wire.

In the prior art as a corrective measure, welding electrodes and rods of aluminum base alloys have been subjected to rigorous surface preparation. This has in many cases included scalping or shaving to eliminate the layer which is contaminated with oxide, and has often been followed by degreasing and acid etching, then neutralizing and washing. These techniques are tedious and add to the expense.

Considerable difficulty also has been encountered when welding by the electric arc method under high current densities using aluminum base alloy electrodes, due to the tendency to melt the electrode at a point remote from the welding arc because of the relatively low conductivity of the aluminum base alloys.

We have discovered that these difficulties can be reduced to a minimum by providing on the surface of the welding electrode or rod a clad metal layer which is of substantially pure aluminum. The clad metal layer therefore has greatly improved corrosion resistance, being much less likely to become coated with oxide during wire fabrication and electrode or welding rod manufacture.

The improved corrosion resistance of the clad metal layer also reduces the need for protective packaging of the electrodes or welding rods, and also permits the electrodes or welding rods to withstand exposure to moisture and other corrosive influences at the point of use, especially in shipyards.

Because of the fact that the pure aluminum cladding metal is of much higher conductivity than the aluminum base alloy, good surface conductivity is obtained where contact must be made with a consumable arc welding electrode. Furthermore the improved conductivity of the cladding layer reduces resistance heating of the electrode overall, and particularly at the surface, so that there is much less likelihood of causing melting of the electrode before it reaches the arc. The uniformly good contact with the electrode assists in obtaining more uniform operation of the electrode feed mechanism, since the feed mechanism does not have to hunt in order to maintain a predetermined voltage. Therefore the stability of the arc is increased.

The presence of the pure aluminum cladding layer also promotes wire drawing at higher speeds.

The advantages above referred to are obtained with aluminum base alloys having as the major alloying ingredient from 2% to 6.5% of copper (the 2000 series, such as 2025, 2117, 2225 and 2219), with aluminum base alloys containing as the major alloying ingredient from 2.5% to 13% of silicon (the 4000 series, such as 4032, 4043 and 4047), and with aluminum base alloys containing as the major alloying ingredient from 1% to 8% of zinc (the 7000 series, such as 7001 and 7072). The principles of the invention are particularly applicable to aluminum base alloys which contain as the major alloying ingredient from 2% to 12% of magnesium (the 5000 series, such as 5154, 5254, 5083, 5456, 5652 and 5556).

It will of course be evident that since the welding electrode or wire is provided with a clad metal layer of substantially pure aluminum, the weld pool will represent uniform fusion of the clad metal layer and the core. Therefore if the core is for example an aluminum base alloy containing magnesium as its major alloying ingredient, the core in the weld pool is diluted by the clad metal layer of pure aluminum, and to allow for this a higher magnesium content will suitably be used in the core alloy than is desired in the weldment.

Considering now the drawings in detail, we will illustrate in FIGURE 1 a consumable electrode 20 withdrawn from a suitable coil 21 through a feed mechanism 22 suggested diagrammatically by the rollers, and entering through electrically insulating bushing 23 into gas shielding welding head 24, where the electrode passes through electrical contact mechanism 25 and discharges through forward opening 26 to maintain arc 27 to the work 28, which will suitably be an alloy of generally similar character to the welding electrode.

A source of suitable protective gas is supplied to the interior of the welding head from cylinder 30 through connection 31. The protective gas may be a suitable monotomic inert gas such as argon, helium or neon.

The source of electrical energy for the arc at 32 is connected by lead 33 through insulating bushing 34 to the contact mechanism 25 connected to the consumable electrode, and is also connected by lead 35 to the work. The electrical source may be alternating or direct current and it may be either straight or reverse polarity as required.

The electrode 20 as shown in FIGURE 1 according to the invention is suitably of any desired wire cross section, a circular cross section being illustrated for convenience, and it includes a core 36 and a clad metal layer extending completely around the outside 37. The thickness of the clad metal layer will vary, but may suitably be about 2 percent of the radius. As already explained in general, the clad metal layer will be of substantially pure aluminum, for example 1260, or electrical conductor grade. The clad metal layer will be applied by any suitable cladding technique, as for example mechanically applying the clad layer as a sheath on the wire bar or billet and then cold-rolling or cold-drawing.

The core will be one of the aluminum base alloys referred to above.

While the illustration in FIGURE 1 shows a consumable electric arc, it will be evident that a non-consumable arc such as a tungsten arc or carbon arc can be used, in which case element 20 is introduced in the arc not as an electrode but as a consumable filler metal which will fuse to produce the weldment.

The invention is also applicable to gas welding, for example oxyacetylene welding in which case the element 20 acts as a consumable filler rod. The advantage of the elimination of porosity in the weld and the avoidance or simplification of cleaning is still present in this instance.

In view of our invention and disclosure, variations and modifications to meet individual whim or particular need will doubtless become evident to others skilled in the art, to obtain all or part of the benefits of our invention without copying the method and structure shown, and we, therefore, claim all such insofar as they fall within the reasonable spirit and scope of our claims.

Having thus described our invention what we claim as new and desire to secure by Letters Patent is:

1. The process of electric arc welding of aluminum, which comprises maintaining an electric arc from the work to a consumable electrode, said electrode having a cladding layer consisting of substantially pure aluminum and a core which is composed of aluminum having as an essential alloying ingredient from 2 to 12% of magnesium, making electrical contact to the cladding layer, and surrounding said arc with a protecting gas.

2. The process of welding with aluminum, which comprises maintaining a fusion zone adjacent to the work, surrounding said fusion zone with a protecting gas, and melting in the fusion zone a consumable filler metal rod having a cladding metal layer of substantially pure aluminum, and having a core composed of an aluminum base alloy having as an essential alloying ingredient from 2 to 12% of magnesium.

3. A consumable filler metal rod melting in an arc to produce a weld deposit, having a cladding layer of substantially pure aluminum, and having a core of aluminum having as an essential alloying ingredient from 2 to 12% of magnesium.

References Cited in the file of this patent

UNITED STATES PATENTS

| | | |
|---|---|---|
| 1,794,983 | Ritter | Mar. 3, 1931 |
| 1,873,470 | Peek | Aug. 23, 1932 |
| 2,122,535 | Nock | July 5, 1938 |
| 2,208,186 | Igarashi | July 16, 1940 |
| 2,815,436 | Bland | Dec. 3, 1957 |
| 2,852,659 | Belz | Sept. 16, 1958 |
| 2,943,180 | Kelker | June 28, 1960 |

FOREIGN PATENTS

| | | |
|---|---|---|
| 459,225 | Canada | Aug. 30, 1949 |
| 427,072 | Germany | Mar. 23, 1926 |